March 1, 1932. R. W. JOHNS 1,847,692
MEANS FOR SEPARATING THE WHITES FROM THE YOLKS OF EGGS
Filed Feb. 16, 1931

Patented Mar. 1, 1932

1,847,692

UNITED STATES PATENT OFFICE

ROY W. JOHNS, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

MEANS FOR SEPARATING THE WHITES FROM THE YOLKS OF EGGS

Application filed February 16, 1931. Serial No. 516,049.

One of the objects of my invention is to provide a means capable of continuous operation, which will eliminate the physical labor involved in separating eggs on a commercial scale.

Another object of my invention is to provide an egg cup adapted to carry the contents of the eggs and to be removably affixed to a conveying means.

Other objects of my invention will be apparent from the description which follows.

Referring now to the drawings, which are made a part of this specification, and in which similar characters of reference identify identical parts in the several figures—

Figure 1:
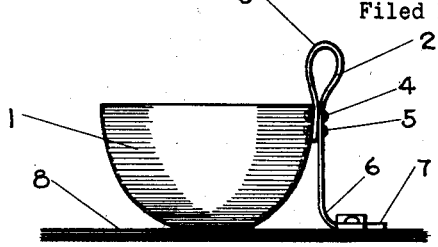
Figure 1 is a side view of a cup affixed to a conveyor belt.
Figure 2:
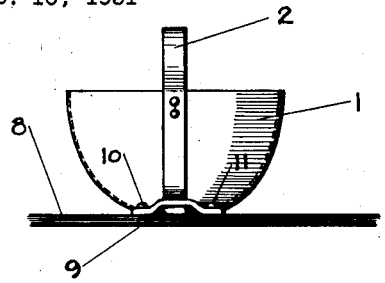
Figure 2 is an end view of the cup affixed to a conveying means, showing the handle in elevation.

It will be noted, in my reference to Figures 1 and 2, that the egg cup comprises a receptacle 1 and a handle 2. The handle 2 passes upwardly, forming loop 3 in the manner more particularly described and claimed by Anson W. DeVout and Richard W. Regensburger in their co-pending application for U. S. patent on improvements in egg tray, filed February 24, 1931, Serial Number 517,781, being affixed to the side of the cup by appropriate means, as rivets 4 and 5. However, it will be noted here that the outer strip of the handle continues down, being bent outwardly at 6, forming extension 7. It will be noted that the distance between the top of the conveyor 8, upon which the cup rests, and the top of loop 3 is equal to the distance from 6 to the top of the loop 3. Extension 7 is preferably made from stainless steel and forms a spring such that the cup may be removably affixed to conveyor 8 by inserting extension 7 under loop 9, loop 9 being rigidly affixed to the belt by appropriate means, as rivets 10 and 11.

Figure 3:
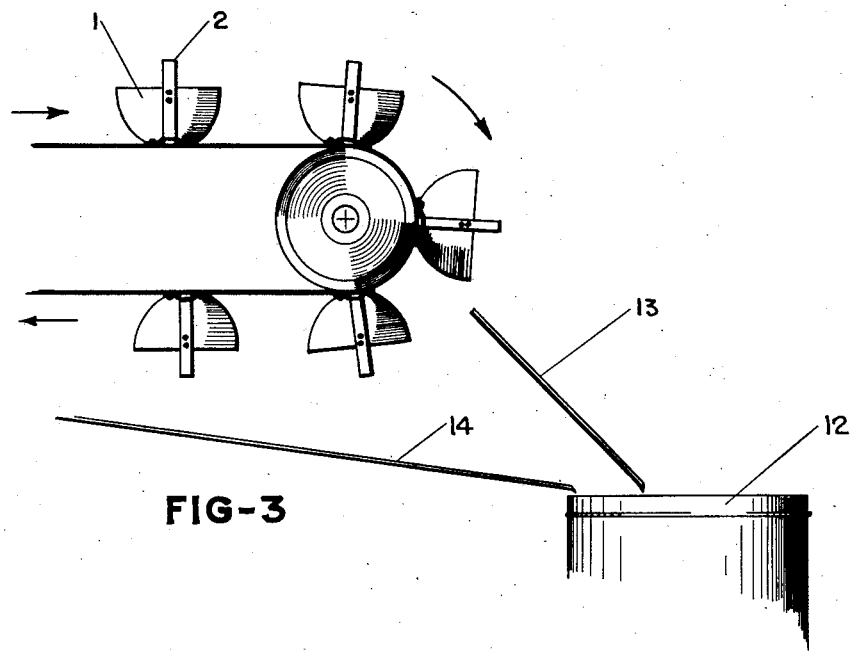
Figure 3 is a detail of the discharge end of the conveyor.

In Figure 3, it will be noted that at the top of container 12, as the cups travel by in the direction of the arrow, the contents of the cups will be dumped upon shelf 13, any drippings being caught by shelf 14, which shelf 14 may be extended as desired to completely underlie the entire mechanism. Troughs may be substituted for shelves 13 and 14. The device shown in Figure 3 is appropriate to the delivery of whole eggs which it is not desired to separate, the eggs being broken out into the cups to permit a ready visual and olfactory inspection.

Figure 4:
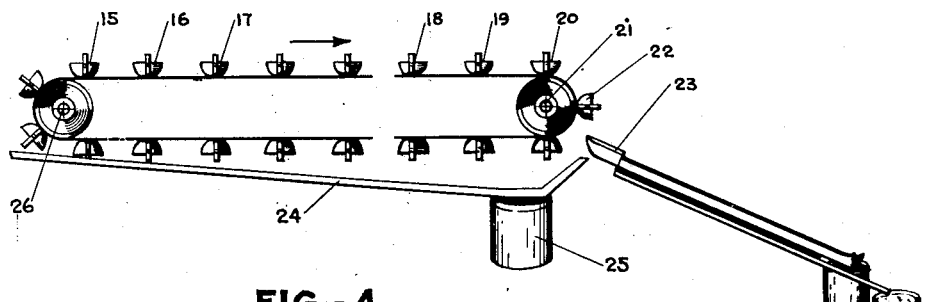
Figure 4 is a side view of the conveyor in section, supporting framework not being shown.

In Figure 4, the device is shown in combination with a slide separator of the type which is described and claimed by Richard W. Regensburger and Charles T. Walter in co-pending application for U. S. patent entitled Method and means for separating whites from yolks of eggs, Serial No. 491,132, filed October 25, 1930. In operation, eggs are broken out by the egg breaker into cups in position as at 15, 16, 17, etc., being subjected to visual and olfactory inspection by an operator, as at 18, 19, 20, etc. If the yolk is broken such that it will not properly separate on a slide separator or the contents of a cup are found on olfactory inspection to be decomposed, the entire cup is removed for disposition of the contents and sterilizing of the cup where necessary. Cups which pass inspection are passed on over shaft 21, dumping at position 22 into slide 23. I prefer to place the trough 24 to catch any drippings of whites as they fall from the cups as they pass on the under side of the conveyor, such drippings being carried to a container as 25. The cups continue over the conveyor and pass up again into a receiving position by passing over shaft 26.

The loop-shaped handle 3 and attaching extension 7 constitute end portions of a metal strap 6, the attaching end being bent laterally so that it faces outwardly for ready engagement with or disengagement from the loop or keeper 9 by a sliding motion. The handle end of the strap 6 is retrorsely bent in an opposite direction to the attaching end 7 and is secured by the same fastening means 4 and 5 employed for attaching the handle to the cup. The loops or keepers 9 are disposed lengthwise of the conveyor 8 to admit of the cups being readily and conveniently removed and replaced by a lateral movement.

It will be understood that while I have shown one form of means for permitting removal of the cups from the conveyor, I do not intend to be limited to such showing, as other suitable means may readily be used in place of the means shown, and it is intended that I be limited only to the scope of the invention as defined in the appended claims.

The invention has been disclosed as means for separating the whites from the yolks of eggs, but it is readily apparent that materials or products other than eggs might be inserted in the cups.

I claim:

1. A cup provided with a handle and a lateral extension to slidingly engage or disengage a keeper on a conveyor.

2. The combination with a conveyor having keepers throughout its length, of detachable cups provided with a handle and with an attaching extension to slidingly engage any one of the keepers of the conveyor.

3. The combination with a cup, of a metal strap having an end bent laterally to provide an attaching extension, and having the opposite end retrorsely bent in a reverse direction to provide a handle, and fastening means securing the retrorsely bent end and forming attaching means between the strap and cup.

Signed at Chicago, Illinois, this 13th day of February, A. D. 1931.

ROY W. JOHNS.